Nov. 10, 1931.        J. E. LOWE        1,831,183
ANIMAL POKE
Filed Dec. 13, 1930

J. E. Lowe,
Inventor

By
Attorney

Patented Nov. 10, 1931

1,831,183

UNITED STATES PATENT OFFICE

JOHN E. LOWE, OF CRYSTAL SPRINGS, MISSISSIPPI

ANIMAL POKE

Application filed December 13, 1930. Serial No. 502,202.

This invention relates to new and useful improvements in restraining devices for animals, and particularly to restraining devices for cattle, generally known as animal pokes.

The principal object of the invention is to provide an animal poke which will effectively prevent the animal getting the head through a fence to feed.

Another object is to provide a device of this character which is simple in construction, and which can be worn by the animal without discomfort.

Other objects and advantages will be apparent from the following description when taken in connection with the accompanying drawings.

Figure 1:
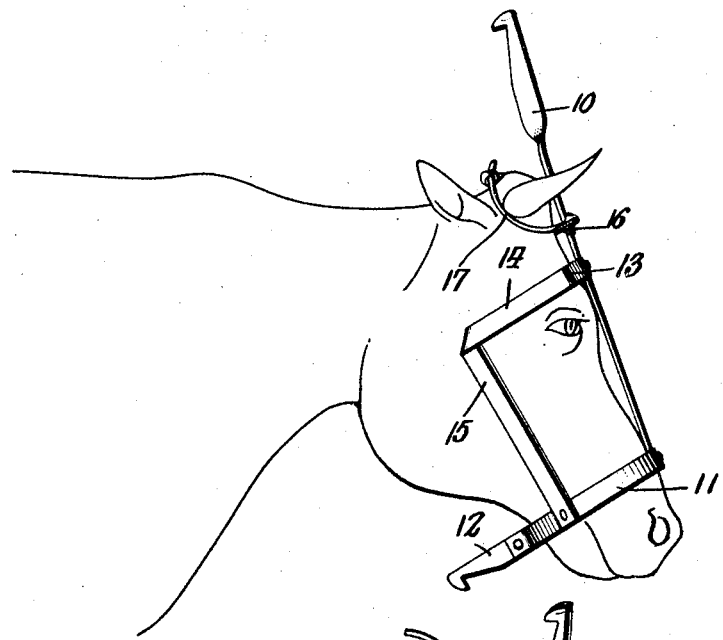
Figure 1 is a side elevation of the invention applied to a cow's head.
Figure 2:
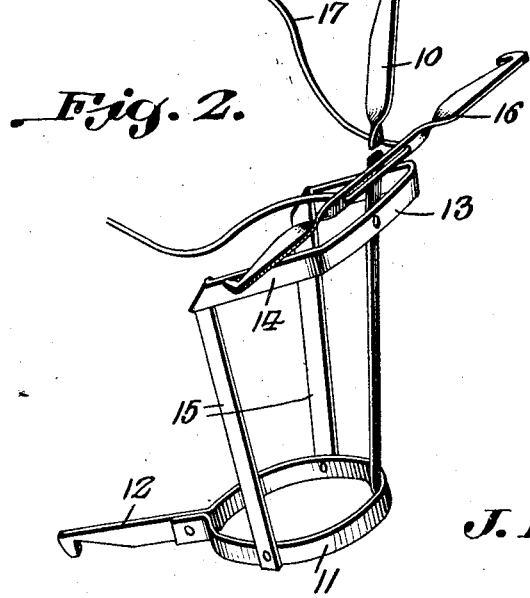
Figure 2 is a perspective view of the device, removed.

Referring particularly to the accompanying drawings, 10 represents a strip of flat metal of a length to extend from a point adjacent the animal's nose, to a point a considerable distance above the horns of such animal, said strip being arranged to extend longitudinally and centrally of the animal's face. Secured to the lower end of the strip 10 is a flat ring 11, which is arranged to encircle the animal's face inwardly of the mouth, so that such ring will not interfere with the movements of the mouth while eating. Extending downwardly from the lower side of the ring 11 is an arm 12, which serves to prevent the animal reaching grass beneath and at the other side of a fence, such arm being adapted to contact with the ground or fence. Secured to the strip 10, at a suitable distance above the ring 11, is a transversely extending strip 13, the opposite ends of which are bent downwardly, as at 14, and hence in the direction of the said ring, as at 15, the terminals of such portions 15 being secured to opposite sides of said ring. The ring 11, the members 15, and the adjacent portion of the strip 10 form a frame which encloses the greater part of the animal's head, as clearly seen in Figure 1, of the drawings. Secured to the strip 10, at such a distance above the strip 13 as to lie beneath the animal's horns, is a transverse strip 16, the opposite ends of which project beyond the portions 14 to such an extent as to prevent the animal thrusting her head through a fence, when the head is turned sidewise. Connected to the transverse strip 16 are the straps 17, preferably of leather, which are adapted to be secured to the animal's horns, to hold the device in proper position, at the upper end thereof, the ring 11, which encircles the animal's face, adjacent the nose, serving to maintain the device in position at the lower end. The portion of the strip 10 extends above the horns to a distance sufficient to effectively prevent the animal damaging the fence with the horns, as well as to prevent getting the head between the bars of such fence.

It will be noted that the upper end of the member 10 is formed with a terminal hook 10', directed rearwardly. It will be understood that, while I have shown this hook 10', extending rearwardly, I may form such hook in a forwardly extending direction, if desired.

What is claimed is:

An animal poke comprising a nose encircling ring, a strip connected with said ring and arranged to extend upwardly beyond the horns of an animal, a transverse strip carried by the first strip adjacent the animal's horns, an arm carried by and projecting below said ring, a transverse frame strip carried by the first strip adjacent the first transverse strip and having extensions arranged to lie longitudinally of an animal's head and secured to said ring, and straps carried by the first transverse strip for attachment to the horns of the animal.

In testimony whereof, I affix my signature.

(REV.) JOHN E. LOWE.